United States Patent [19]

Kepes et al.

[11] 4,141,953

[45] Feb. 27, 1979

[54] METHOD FOR ACCELERATING THE TRANSFORMATION OF THE CRYSTALLINE FORM OF ISOTACTIC POLYBUTENE PIPE

[75] Inventors: Andre Kepes, Le Vesinet; Jacques Joye, Lille, both of France

[73] Assignee: Societe Chimique des Charbonnages CdF Chimie, Paris, France

[21] Appl. No.: 711,820

[22] Filed: Aug. 5, 1976

[30] Foreign Application Priority Data

Aug. 5, 1975 [FR] France ............................ 75 24406

[51] Int. Cl.² ............................................ B29C 25/00
[52] U.S. Cl. ........................................ 264/340; 264/209; 264/232
[58] Field of Search ............... 264/292, 285, 209, 340, 264/291, 290 R, 232, 286, 323, 339; 526/349

[56] References Cited

U.S. PATENT DOCUMENTS

| 3,089,187 | 5/1963 | Wolfe | 264/290 |
|---|---|---|---|
| 3,551,194 | 12/1970 | Shepherd et al. | 264/320 |
| 3,939,243 | 2/1976 | Dawson | 264/209 |

FOREIGN PATENT DOCUMENTS

| 772662 | 4/1957 | United Kingdom. |
|---|---|---|
| 849916 | 9/1960 | United Kingdom. |
| 934393 | 8/1963 | United Kingdom. |
| 972571 | 10/1964 | United Kingdom. |
| 1194162 | 6/1970 | United Kingdom. |
| 1322932 | 7/1973 | United Kingdom. |
| 1336669 | 11/1973 | United Kingdom. |

Primary Examiner—James B. Lowe
Attorney, Agent, or Firm—Finnegan, Henderson, Farabow & Garrett

[57] ABSTRACT

A method for the accelerated transformation of the crystalline form of isotactic polybutene pipe, comprising moving the pipe linearly and subjecting the pipe while moving to a plurality of simultaneously inwardly directed radial stresses acting on the outer surface of the pipe along one or more radii of the same transverse cross section and in one or more adjacent cross sections of the pipe and apparatus for carrying out such method.

11 Claims, 6 Drawing Figures

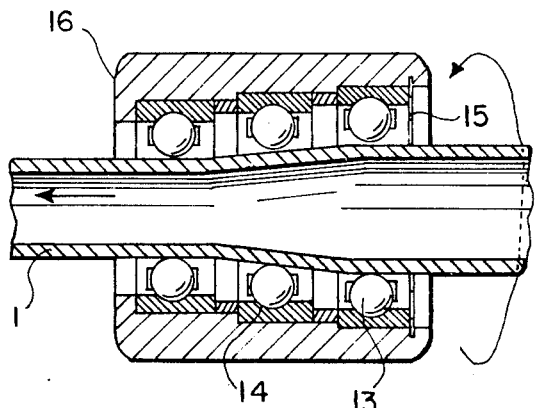
FIG 3
FIG 6
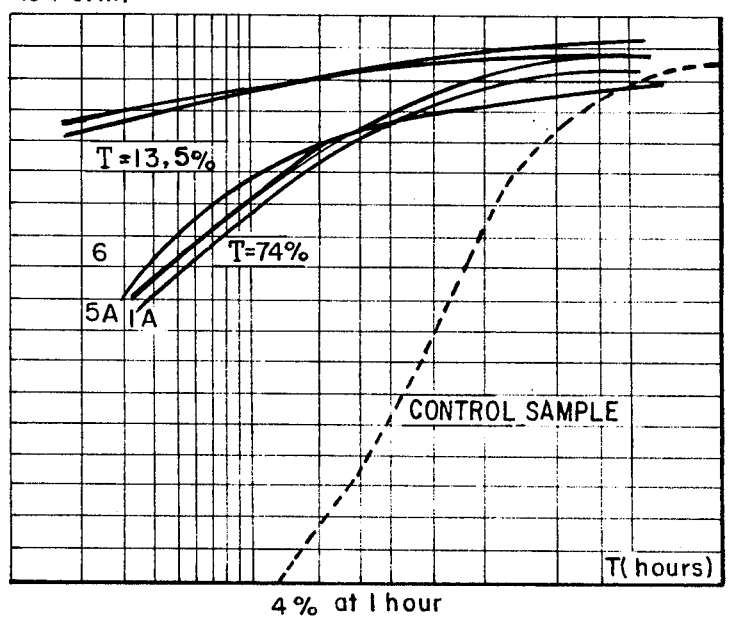

METHOD FOR ACCELERATING THE TRANSFORMATION OF THE CRYSTALLINE FORM OF ISOTACTIC POLYBUTENE PIPE

This invention relates to a method and apparatus for the accelerated crystalline transformation of isotactic polybutene-1 pipes from form II to form I.

It is known that by cooling isotactic polybutene-1 in the molten state, even at high speed, one invariably obtains crystals of the metastable tetragonal form II, whose mechanical properties are mediocre. This form evolves spontaneously and irreversibly into the stable and rhombohedral form I, with a change in the appearance and physical properties (melting point, density) of the material.

At normal temperature and pressure, the crystalline transformation is completed within 1 to 7 days depending on the molecular weight and tacticity of the resin, its method of preparation (in particular the pressure used) or the presence of impurities and various additives.

This polymorphism of polybutene-1, however, creates difficulties for storing molded parts of large dimensions and in particular pipes, since it is impossible to transport and handle these parts during the first days following their extrusion without danger of deformation. Immediately after extrusion, the pipe is frequently wound on drums and after several days, if crystalline conversion has taken place in the wound state, it becomes virtually impossible to unwind the pipe, which is now in the form of rigid spirals.

It is therefore desirable to provide an accelerated aging process to avoid these problems and to make the pipe competitive with pipes made from rival plastics materials.

Numerous methods have been proposed for accelerating this crystalline transformation, with varying degrees of success, but all have numerous drawbacks regarding the subsequent transformation of the products.

A first method consists of incorporating various additives or comonomers in the polybutene such as stearic acid, alpha-chloroprene, diphenyl ether, isocumyle acetate or dioctylphthalate as the additive and ethylene, propene or pentene as the comonomer. Despite the substantial increase in the conversion speed, aging by this method has not proven entirely satisfactory, because the co-polymerisation and incorporation of additives unfavorably influence the mechanical and optical properties of the resulting form I product.

A second method consists of subjecting the pipe in form II, at room temperature, to a pulling force, causing an elongation on the order of 200%. This method, however, is technically very difficult to carry out on parts of large dimensions and it also produces an anisotropic effect which is detrimental to the mechanical properties of the pipe. According to British Pat. No. 1,349,286, a variation of this method consists of carrying out a smaller elongation at a lower temperature. It is thus possible in 5 minutes, to convert 90% of form II into form I, by providing an extension of from 22% to 50% along one or more axes, at a temperature between $-15°$ C. and $+7°$ C. Apart from the drawbacks mentioned for the basic method, the lower the temperature required for a given elongation, the higher the desired conversion rate, and this results in an additional consumption of energy on the extrusion line.

Further, according to U.S. Pat. No. 3,205,289, it is known to increase the resistance to bursting of a thermoplastic pipe by cold working the pipe on an inner mandrel having an outer diameter greater than or equal to the inner diameter of the pipe. In this method, a deformation is applied to the pipe by rotary pressure means which transmits a force simultaneously in the longitudinal and circumferential directions, while keeping the internal diameter of the pipe constant and while maintaining the temperature of the thermoplastic material between the transition points of the first and second orders. Nevertheless, in the case of polybutene-1 with an equal duration of the resistance to bursting, the admissible transverse stress in a pipe subjected to this method is decreased by more than 25% at 20° C. and by more than 40% at 80° C. with respect to a control pipe. Thus, for safety reasons, the use of such pipes is effectively prohibited in most applications.

Accordingly, an object of this invention is to provide a method for the accelerated transformation of the crystalline form of pipes made of isotactic polybutene, which is simple to carry out regardless of the dimensions of the parts to be treated and which facilitates cost savings both in the consumption of energy and in the time taken for the treatment. The purpose of this method is also to improve storage facilities and accuracy of the dimensions as well as the surface condition (brightness) of the product.

A further object of this invention is to provide apparatus for carrying out this method, which may be used directly on a continuous extrusion line.

The method according to the invention is characterized in that the pipe while in linear motion is subjected to a plurality of simultaneous inwardly directed radial stresses acting on the outer surface of the pipe along one or more radii of the same straight or transverse cross section and in one or more adjacent transverse cross sections. The regions of stress in the same section define a polygonal line generally inscribed in a circle concentric with the original cross section of the pipe.

According to a preferred aspect of the invention, this polygonal line describes a path of movement, for example a helical rotative path, with respect to the pipe. The deformation applied to the pipe may be varied infinitely by modifying the shape of the polygonal lines and the nature of the movements imparted thereto and it may bring about a longitudinal displacement of material without the effects of the latter merging with those of a drawing operation. Thus, several embodiments, to which the invention is not limited, have been chosen for explaining the operation of the method.

A first embodiment consists of a method of cyclic radial stresses or alternate bending. This consists of imposing a rotary polygonal deformation on the original circular section of the pipe of diameter $\phi_o$, by a combination of the linear movement of the pipe and the rotary movement of a mandrel driving the members for producing stress.

According to a preferred embodiment, the polygonal deformation is regular and concentric with the original section of the pipe and each mandrel supports a limited number of means for producing stress. Thus, for example, when the polygon is an equilateral triangle (three members for producing stress per mandrel), the transverse maintenance and equilibrium of stresses in each region of stress is ensured in a particularly satisfactory manner. An increase in the number of members for producing stress per mandrel causes the disappearance of the main transverse bending effect for the benefit of compression along the circumference of the pipe, which corresponds to another variation described hereafter.

Furthermore, it is possible to provide several mandrels in series, moving at different rotary speeds as regards direction and magnitude, in order to reduce the secondary effect of longitudinal twisting of the pipe induced by friction. In this case, the intensity of the stresses produced by the members of each mandrel may be regulated independently. As $\phi$ being the diameter of the inner circle of the members for producing stress, the crushing rate $$\tau = \frac{\phi_o - \phi}{\phi_o}$$

will preferably be chosen to be less than or equal to 15%. The brightness of the pipe is improved by the mechanical treatment when the speed of forward movement $V/\omega$ is less than or equal to 2mm/revolution where V is the forward speed of the pipe and $\omega$ is the rotating speed of the mandrel.

A second embodiment consists of a method of radial stress or circumferential compression. The latter consists of locating the means for producing stress along one or more pairs of regular identical polygonal sets, the two polygons of the same pair rotating at the same speed with a constant phase displacement equal to half a sector of the polygon. For example, when each mandrel supports six members for producing stress, the phase displacement between the two regular hexagons supported by the two rigidly connected mandrels, is equal to 30°. With this definition of the phase displacement and when the distance separating the planes of the two polygons of the same pair is sufficiently reduced to facilitate mutual clearance of the longitudinal propagations, the deformation of the section of pipe thus placed under stress is quasi-cylindrical.

A third embodiment consists of a method of radial stress of cyclic transverse deviation. It consists of imposing on the original circular section of the pipe of diameter $\phi_o$, the deformation obtained by combining the linear movement of the pipe and the oscillatory movement (comprising two transverse components) of a movable support located between two fixed supports. The distances separating this movable support from each of the fixed supports are preferably such that the ratio of the larger distance to the smaller distance is between 2 and 10. On the other hand, in this type of stress, the best results are obtained when the frequency of the deviation is less than 300 Hertz and when the amplitude A of the deviation is such that the ratio of $A/\phi_o$ is less than or equal to 0.3. This embodiment of the invention has the particular advantage that the work of the frictional forces between the movable support and the pipe, being reduced to the work of the single longitudinal components of these forces along the pipe, can be neglected and consequently heating of the pipe is prevented and the energy consumed is reduced.

A fourth embodiment, consisting of combining two stresses of the preceding type in phase opposition, relates to a method of radial stresses, or alternate transverse shearing, obtained for example by distributing members for producing stress between one or more pairs of parallel and identical polygonal sets rotating in phase opposition about the axis of the pipe. In such a method, which is similar to the method using circumferential compression, the main shearing effect is accompanied by secondary transverse and longitudinal bending effects.

The invention also relates to apparatus for carrying out the method. These mechanisms will be described with reference to the above-mentioned embodiments and the drawings.

Of the drawings:

FIG. 3 is a diagrammatic longitudinal sectional view of another mechanism used according to the invention.

FIG. 6 shows the result obtained according to the invention.

Figure 1:
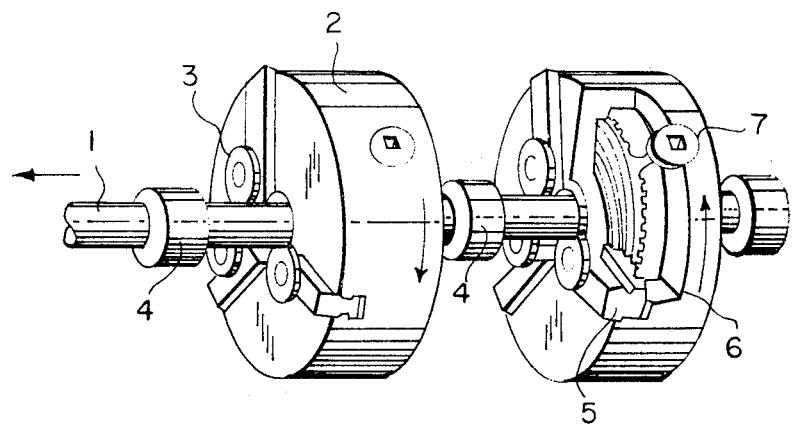
FIG. 1 is a diagrammatic perspective view of a mechanism used for carrying out the invention.

FIG. 1 is a diagrammatic perspective view of a mechanism for carrying out the first embodiment of the method method, in which the radial stresses are alternate bending stresses applied by a limited number of members. This mechanism comprises at least one mandrel 2 rotating at a speed $\omega$ through which the pipe 1 moves forward at a speed V. This mandrel is supported by a fixed frame which may be located on the extrusion line, alignment with the extruder and it drives three rollers 3 circumscribed in an inner circle which is concentric to the original outer circumference of the pipe. When there are several mandrels, the diameters of such circles may be adjusted independently. The pipe moves forwards freely in the guides 4 located upstream and downstream of the mandrel. The rollers are mounted on slides 5 arranged in the form of a star on the mandrel. These slides are governed by a mechanism 6 housed in the body of the mandrel and facilitating adjustment of the spacing of the rollers, while ensuring that the circles internally tangential to the rollers remain coaxial. A mechanism of this type may be constituted by transverse grooves on the slide which fit in a spiral groove on a rotary plate movable inside the mandrel and it is controlled externally by a key 7.

By combination of the linear movement of the pipe and the rotary movement of the mandrel, each roller describes on the outer surface of the pipe, a helix supported by a cylinder inscribed inside the rollers and having a pitch equal to 2 $\pi V/\omega$. To eliminate any phenomenon of resistance to forwards movement of the pipe, a mechanical device may be provided enabling each roller to move freely in contact with the pipe along the line tangential to the helix. So-called "swivel joint" rollers constitute an example of such a device. To summarize, this mechanism makes it possible to subject any basic torus cut in the pipe to a certain number of cyclic deformations of frequency equal to 3 $\omega$.

Figure 2:
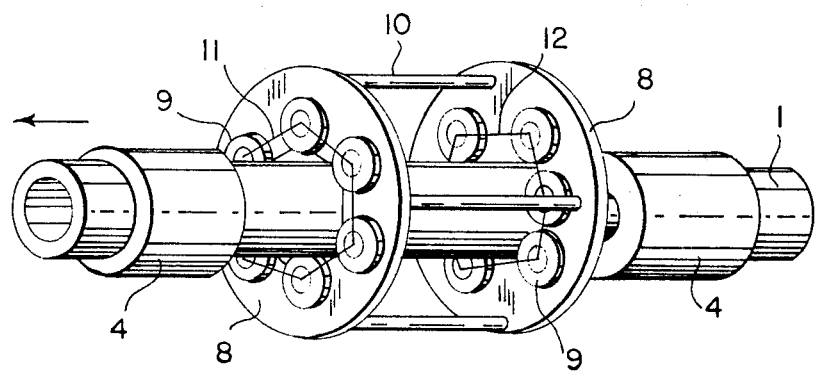
FIG. 2 is a diagrammatic perspective view of another mechanism used for carrying out the invention.

FIG. 2 is a diagrammatic perspective view of a mechanism for carrying out the second embodiment of the method, in which the radial stresses are circumferential compressions applied by members in two polygon pairs constantly mutually displaced by half a sector of the polygon. This mechanism comprises two rigid discs 8 each supporting six rollers 9 and connected by rods 10 parallel to the pipe 1. In each cross section of the pipe, the rollers define regular hexagons 11 and 12 having a constant phase displacement of 30°.

FIG. 3 is a diagrammatic longitudinal section of another mechanism for carrying out the second embodiment of the method. This mechanism comprises an arrangement of balls 13 travelling in a groove 14 whose transverse median plane is substantially at right-angles to the axis of the pipe 1. This groove is provided in a ring 15 housed, with adjacent rings of the same type, in a cylinder 16 rotating about the pipe. These rings may be provided in the cylinder in order to obtain increasing rates of compression.

Figures 4, 5:
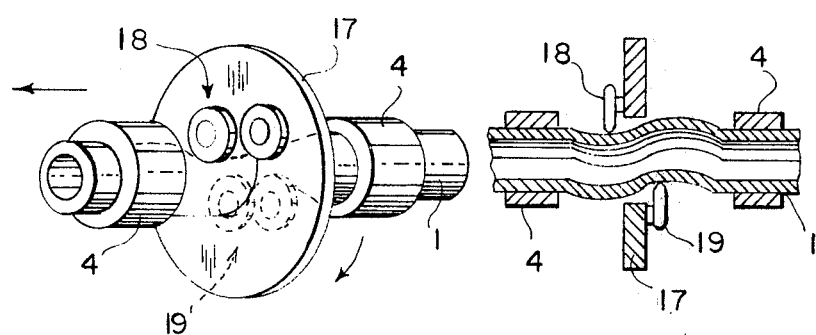
FIGS. 4 and 5 are diagrammatic views in perspective and longitudinal section of another mechanism used according to the invention.

FIGS. 4 and 5 are respectively a diagrammatic perspective view and longitudinal sectional view of a mechanism for carrying out the fourth embodiment of the method, in which the radial stresses are alternate transverse shearings applied by members in two polygon pairs in adjacent planes, the members of the two pairs being mutually opposed. A rigid disc 17 rotated about the original axis of the pipe 1 is provided with two sets of rollers 18 and 19 arranged on either side of its central plane, symmetrically with respect to its center. In its movement about the pipe, each set of rollers describes a circle centered on the axis of the disc and of diameter R less than the original outer diameter $R_o$ of the pipe. The section of pipe between the guides 4 located upstream and downstream assumes a sinusoidal deformation of maximum amplitude equal to $R_o - R$ and the section comprised between the planes of contact of the rollers is thus subject to alternate transverse shearing whose frequency is equal to the speed of rotation $\omega$ of the disc. The compression rate of the pipe is therefore defined by the ratio $R_o - R/R_o$. It is possible to increase the supporting surface on each side of the disc by increasing the number of rollers in order to reduce the ovalization of the pipe as it passes through the rollers. It is obviously possible to multiply the number of such mechamisms in series.

Generally and whatever the mechanisms adopted, the means for providing stress and the guides located upstream and downstream of the mechanisms will be chosen so as not to cause considerable friction on the walls of the pipe. The guides may have direct contact (by means of rolling members) or indirect contact (by means of a fluid).

Although the present invention has been described with reference to preferred and simple embodiments, equivalent embodiments creating the same type of stress also form part of this invention.

Reference will now be made to the following examples but without any intention to be limited thereto.

EXAMPLE 1

A pipe made from polybutene-1 having a melt index of 0.1 dg/min is subjected to alternate bending by means of a mechanism such as that illustrated in FIG. 1.

The pipe, whose forwards speed V may be varied, has an original outer diameter $\phi_o = 32.4$mm. $\phi$ is the diameter of the inner circle of the rollers of the downstream mandrel and the value of the ratio $\phi_o - \phi/\phi_o$ is the crushing rate $\tau$. In table I, the rate of 7.4% corresponds to $\phi = 30$mm and 13.5% when $\phi = 28$mm. The stress time t is measured by:

$$t = l \times n \times N/V$$

where l is the mean longitudinal dimension of the impact surface of a roller on the pipe, an increasing function of the crushing rate; n is the number of rollers per mandrel; N is the number of mandrels; and V is the velocity of the pipe.

In this case n = 3, N = 2 and l amounts to approximately 5mm. Under these conditions, the stress lasts for 1.2 seconds when V = 1.5m/min.

The main value measured at an interval of time T after each test, is the amount of form I of polybutene on the outer and inner sides of the pipe. It is determined by X-ray diffraction according to the method explained by R. Zanetti in Chimica e l'Industria, Volume 43, number 7, page 735 (1961). A quarter of an hour after the treatment, the elastic limit LE and the modulus of elasticity on bending MEF are measured and mean values calculated from 5 dynamometric tests and expressed in kg/cm².

Table I gives the results of these measurements and FIG. 6 translates graphically into simi-logarithmic coordinates, the evolution of the rate of form I as a function of T.

With an equal duration T, the crystalline transformation is the more complete as:

the lower the speed of rotation $\omega$, all other things being equal.

The higher the crushing rate $\tau$, all other things being equal.

Nevertheless, it is not always advantageous to increase $\tau$, in fact, the tests carried out with $\phi = 26$ mm, or $\tau = 19.8\%$, produced ovalized pipes which crumble. The value of $\tau$ for which the compromise between the crystalline transformation and the external appearance of the product ceases to become industrially advantageous, depends on numerous factors; in particular the quality of the polybutene and the duration of treatment.

The dynamometric properties of polybutene-1 are maintained or improved after treatment with respect to the control sample. Thus, the longitudinal braking strenth is 363 kg/cm² for test No. 4A and 418 kg/cm² for test No. IB against 316 kg/cm² for the control sample. The elongation at rupture remains constant and the flexibility of the finished product is improved since the modulus of elasticity on bending MEF measured 7 days after the treatment amounts to 3,500 kg/cm² for test 1B against 4025 kg/cm² for the control sample. The outer diameter of the pipe after treatment is 31.0 mm for a crushing rate of 7.4%; 29.9 mm for a crushing rate of 13.5%. After treatment, the thickness of the pipe has a mean value of 3.5 mm.

TABLE I

| Test No. | $V/_{m/mn}$ | $\omega$revolutions/$_{mm}$ | $\tau\%$ | Elastic limit | Modulus of elasticity or bending | T(hours) | % form I |
|---|---|---|---|---|---|---|---|
| Control | 1.5 | — | — | 68 | 2.225 | 1 | 4 |
|  |  |  |  |  |  | 10 | 67 |
|  |  |  |  |  |  | 100 | 93 |
| 1A | 1.5 | 700 | 7.4 | 115 | 3.050 | 0.3 | 51 |
|  |  |  |  |  |  | 1 | 71 |
|  |  |  |  |  |  | 10 | 88 |
| 1B | 1.5 | 700 | 13.5 | 162 | 3.050 | 0.3 | 77 |
|  |  |  |  |  |  | 1 | 86 |
|  |  |  |  |  |  | 10 | 93 |
| 2 | 10 | 700 | 13.5 | 169 | — | 0.3 | 86 |
|  |  |  |  |  |  | 1 | 88.5 |

TABLE I-continued

| Test No. | $V_{m/mn}$ | $\omega$ revolutions/$_{mm}$ | $\tau\%$ | Elastic limit | Modulus of elasticity or bending | T(hours) | % form I |
|---|---|---|---|---|---|---|---|
| | | | | | | 10 | 93 |
| 3 | 0.7 | 300 | 7.4 | — | — | 0.3 | 82 |
| | | | | | | 1 | 86 |
| | | | | | | 10 | 91 |
| 4A | 0.7 | 500 | 7.4 | 122 | — | 0.3 | 62 |
| | | | | | | 1 | 75 |
| | | | | | | 10 | 87 |
| 4B | 0.7 | 500 | 13.5 | 164 | — | 0.3 | 89 |
| | | | | | | 1 | 91 |
| | | | | | | 10 | 93.5 |
| 5A | 0.7 | 700 | 7.4 | — | — | 0.3 | 55 |
| | | | | | | 1 | 74 |
| | | | | | | 10 | 90 |
| 5B | 0.7 | 700 | 13.5 | — | — | 0.3 | 84 |
| | | | | | | 1 | 88.5 |
| | | | | | | 10 | 93 |
| 6 | 0.3 | 700 | 7.4 | — | — | 0.3 | 55 |
| | | | | | | 1 | 73 |
| | | | | | | 10 | 86 |
| 7A | 0.3 | 500 | 7.4 | — | — | 0.3 | 81 |
| | | | | | | 1 | 88 |
| | | | | | | 10 | 93 |
| 7B | 0.3 | 500 | 13.5 | — | — | 0.3 | 87.5 |
| | | | | | | 1 | 90.5 |
| | | | | | | 10 | 93 |
| 8A | 0.3 | 300 | 7.4 | — | — | 0.3 | 72 |
| | | | | | | 1 | 81 |
| | | | | | | 10 | 92 |
| 8B | 0.3 | 300 | 13.5 | — | — | 0.3 | 92 |
| | | | | | | 1 | 93.5 |
| | | | | | | 10 | 94 |

EXAMPLE 2

Certain properties of the control pipe (TT) of the pipe treated according to test 1B of example 1 (TS) and of a pipe treated according to U.S. Pat. No. 3,205,289 (TL) are compared. These properties are firstly the overall crystallinity of the sample, determined by differential enthalpic analysis and on the other hand the secant modulus and the admissible transverse strain (in kg/cm²) of the sample for a period of withstanding bursting of $10^3$ hours. Their values are given in the Table II below.

TABLE II

| Sample | % Crystallinity | Secant Modulus | Transverse Strain (20% C) | Transverse Strain (80% C) |
|---|---|---|---|---|
| TT | 57.7 | 8 300 | 185 | 120 |
| TS | 61.8 | 4 800 | 160 | 90 |
| TL | 51.5 | 3 500 | 133 | 70 |

What we claim is:

1. A method for the accelerated transformation of the crystalline form of isotactic polybutene pipe, comprising moving the pipe linearly and subjecting the pipe while moving to a plurality of inwardly directed radial stresses simultaneously applied in at least two adjacent cross sections of the pipe and along at least one radius of each cross section.

2. The method of claim 1, wherein the regions of stress in the same cross section define a polygonal line generally inscribed in a circle.

3. The method of claim 2, wherein the circle of stress is concentric with the original cross section of the pipe.

4. The method of claim 2, wherein the polygonal line describes a helical path with respect to the pipe.

5. The method of claim 1, wherein the radial stresses are alternate bending stresses obtained by means of a limited number of members rotated around the outside of and about the axis of the pipe in a first plane perpendicular to the axis of the pipe and an equal number of members rotated around the outside of and about the axis of the pipe in a second plane, adjacent to said first plane, perpendicular to the axis of the pipe, and wherein the pipe is subjected to a crushing rate $\tau$, where $\tau = \phi_o - \phi/\phi_o$ and is less than or equal to 15% when $\phi_o$ is the orginal outer diameter of the pipe and $\phi$ the inner diameter of the means for producing the stress.

6. The method of claim 2, wherein said radial stresses are circumferential compressions obtained by means of a number of members distributed along one or more pairs of identical regular polygonal lines, the two polygonal lines of each pair being in adjacent planes and rotating at the same speed with a constant phase displacement equal to half a sector of the polygon.

7. The method of claim 2, wherein said radial stresses are alternate transverse shearings obtained by means of a number of members rotated about the axis of the pipe and distributed along one or more pairs of identical polygonal lines, the two polygonal lines of each pair being in first and second adjacent and parallel planes respectively, said members in said second plane being opposed to said members in said first plane.

8. A method for the accelerated transformation of the crystalline form of isotactic polybutene pipe, comprising moving the pipe linearly and subjecting the pipe while moving to a plurality of inwardly directed radial stresses applied in at least one cross section of the pipe, wherein said radial stresses are cyclic transverse deviations obtained by means of a moving support through which the pipe moves linearly, said moving support being submitted to an oscillatory motion in each of two transverse directions, and said moving support being placed between a first fixed support and a second fixed support through which the pipe moves linearly.

9. The method of claim 8, wherein the ratio of the distance between the moving support and the first fixed support to the distance between the moving support and the second fixed support is between 2 and 10.

10. The method of claim 8, wherein the frequency of the oscillatory motion of the moving support is less than 300 Hertz.

11. The method of claim 8, wherein the ratio of the amplitude of the oscillatory motion of the moving support to the original diameter of the pipe is less than or equal to 0.3.

* * * * *